United States Patent [19]

Berchem

[11] Patent Number: 4,932,432
[45] Date of Patent: Jun. 12, 1990

[54] SHUTOFF AND FLOW-CONTROL VALVE

[75] Inventor: Rütger Berchem, Essen, Fed. Rep. of Germany

[73] Assignee: Metalpraecis Berchem + Schaberg Gesellschaft fur Metallformgebung mit beschrankter Haftung, Gelsenkirchen-Uckendorf, Fed. Rep. of Germany

[21] Appl. No.: 307,383

[22] Filed: Feb. 6, 1989

[30] Foreign Application Priority Data

Feb. 5, 1988 [DE] Fed. Rep. of Germany ..... 38034174

[51] Int. Cl.⁵ .............................. F16K 5/06; F16L 7/00
[52] U.S. Cl. .................................. 137/375; 251/315; 251/368
[58] Field of Search ................. 251/315, 368; 137/375

[56] References Cited

U.S. PATENT DOCUMENTS

| | | |
|---|---|---|
| 3,073,336 | 1/1963 | Johnson ............................. 137/375 |
| 3,334,650 | 8/1967 | Lowrey et al. ................. 251/315 X |
| 3,547,403 | 12/1970 | Grauer ............................ 251/315 X |
| 3,985,150 | 10/1976 | Kindersley ..................... 251/315 X |
| 4,136,709 | 1/1979 | Rogers et al. ........................ 137/375 |
| 4,575,047 | 3/1986 | Boos et al. ............................ 137/468 |

Primary Examiner—John Rivell
Assistant Examiner—L. R. Leo
Attorney, Agent, or Firm—Herbert Dubno

[57] ABSTRACT

A controlling valve, especially a valve ball, for a gaseous and liquid flow material, comprises a housing, two connector pipes, a flow-adjusting component and associated valve seat components. The flow-adjusting component and the valve seat components have corresponding flow ducts, which are provided in a special component made from sintered ceramic material. At least the flow duct of the flow-adjusting component is located in a sintered ceramic sleeve. This sleeve is inserted in a passage in the flow-adjusting component and pressure-relieved in regard to material flow. The sleeve is held under frictional forces or just fits in the passage.

7 Claims, 2 Drawing Sheets

SHUTOFF AND FLOW-CONTROL VALVE

CROSS-REFERENCE TO RELATED APPLICATIONS

This application is related to the following commonly owned copending patent and applications:
U.S. Pat. No. 4,795,133 issued 3 January 1989;
Ser. No 07/145,832 filed 20 January 1988;
Ser. No. 07/145,833 filed 20 January 1988;
Ser. No. 07/101,187 filed 25 September 1987;
Ser. No. 07/222,189 filed 21 July 1988; and
Ser. No. 07/247,113 filed 20 September 1988.

FIELD OF THE INVENTION

My invention relates to a controlling valve for gaseous and liquid media, especially to a ball valve or cock.

BACKGROUND OF THE INVENTION

A controlling valve, especially a ball valve, for a gaseous and liquid flow medium can comprise a housing, connector pipes, a flow-adjusting component and valve seat components. The flow-adjusting component and the valve seat components have suitable flow ducts, which are provided in sintered ceramic material. This sintered ceramic material, the so-called industrial ceramic, can take the physical and/or chemical action which various flow materials, especially corrosive flow materials, exert on it.

Generally the flow-adjusting component, which seals without using elastomeric materials, fits the valve seat components. An appropriate precision machining is required for this purpose. The housing and connector pipes are generally made of a metal, usually steel.

In the known controlling valve, on which the invention is based (e.g. German Patent No. 35 45 547) the flow-adjusting component and the associated valve seat components are solid and are made from sintered ceramic material. This arrangement is expensive because the advantageous properties of the sintered ceramic material are only needed in the vicinity of the flow ducts and are only necessary there. Nevertheless, up to now a solid flow-adjusting component made completely from sintered ceramic material has been required and deemed necessary.

OBJECTS OF THE INVENTION

It is an object of my invention to provide a less expensive controlling valve using sintered ceramic material for gaseous and liquid media, especially for a corrosive media.

It is another object of my invention to provide a more economical controlling valve using sintered ceramic material for gaseous and liquid media, especially for a corrosive media, in which sintered ceramic material is used only in the vicinity of the flow ducts.

SUMMARY OF THE INVENTION

According to my invention, at least one flow duct of the flow-adjusting component is located in a sleeve which is made of the sintered ceramic material. This sleeve is inserted in a passage of the flow-adjusting component, pressure-relieved in regard to material flow, and the sleeve is held in a press fit or just fitting in the passage. Then the sleeve may be formed in one piece. However it is also possible to make the sleeve in several sleeve pieces.

In one advantageous embodiment, the sleeve pieces can be assembled each in another in a conical fit (inner cone in an outer cone).

In the controlling valve according to my invention connecting elements act to hold the sleeve in the flow-adjusting component and/or in the valve seat components. It is usually sufficient when the sleeve and/or the sleeve pieces have connecting elements in the form of projections which cooperate with complementary recesses in the flow-adjusting component and/or in the valve seat components. The connecting elements take only the forces which are exerted by the flow media on the sleeve and the sleeve is mounted free of constraints.

A constraint-free configuration is also attained when the sleeve is held under frictional forces in the associated passage. The press-fit or friction fit can however be made with elastomeric elements.

It is thus an aspect of my invention to provide a shut-off and flow-control valve which is a ball valve, in which a sleeve made of a sintered ceramic material is inserted in the valve ball and the valve seat components are made in one piece from sintered ceramic material.

The advantages attained are that in the controlling valve which has all positive properties of the current valve, less sintered ceramic material is used without impairing the functioning of the valve in any way. Surprisingly in this way one can operate with sleeves made of sintered ceramic material when these are inserted in other components properly pressure-relieved without disturbing mechanical forces. By a "pressure-relieved" sleeve I mean that the static pressure of the medium in the flow also acts indirectly through soft seals in the valve seat rings and therefrom onto the exterior of the sleeve.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
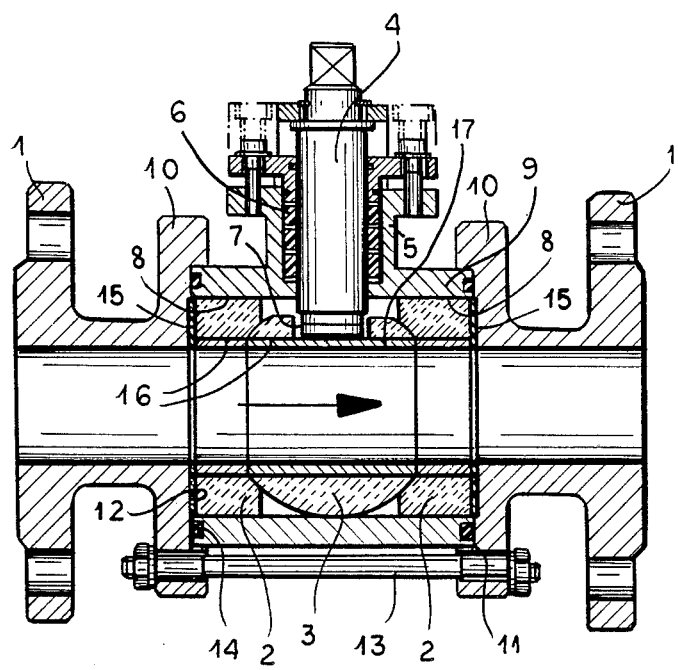
FIG. 1 is a longitudinal cross sectional view through one embodiment of a controlling valve according to my invention in the form of a ball valve.

The ball valve illustrated in the drawing is a controlling valve suitable for a gaseous and liquid flow media, especially for an abrasive solid/fluid mixture.

It basically comprises two connector pipes 1, valve seat rings 2, a valve ball 3, an operating shaft 4 and a housing 5 with a shaft guide and a shaft seal 6. The valve ball 3 and the valve seat rings 2 are formed in a special way according to my invention. They have flow ducts indicated by the flow arrows, which are formed in sintered ceramic material.

The valve ball 3 is mounted in the valve seat ring 2 in an elastomer-free seal. It has a recess or receptacle 7, in which the shaft is shaped to fit and is inserted.

The operating shaft 4 is guided in the shaft seal 6, which comprises a sleeve seal.

The housing 5 receiving the shaft seal 6 includes a casing element 9 enclosing the outer peripheral surfaces 8 of the valve seat rings 2. In this example and many other advantageous embodiments of my invention, the valve seat rings are mounted in the casing element 9 with a tolerance of from 15 to 50 micrometers.

The connector pipes 1 have an inner diameter which corresponds to the passage of the valve seat rings 2 and the valve ball 3. The connector pipes 1 have a clamping flange 10 with a ring-shaped recess for the casing element 9 in their sides facing the housing 5 and with sealing surfaces contacting the facing surfaces 12 of the valve seat rings 2.

The casing element 9 of the operating shaft guiding housing is inserted in the ring-shaped recess 11 of the clamping flange 10 and is clamped between the opposing clamping flanges 10.

Tie-rods or tension bolts 13 act as clamping members. The circular cord seals 14 or O-ring packings are positioned between the casing element 9 and the clamping flange 10.

The connector pipes 1 and the housing 5 are bolted together into a rigid unit sealed to the exterior, in which the ceramic components are mounted free of pressure and bending forces and moments.

A soft seal 15 is located between the outer facing surface 12 of the ceramic valve seat rings 2 and the complementary sealing surfaces of the clamping flanges 10.

This soft seal 15 provides the valve seat rings 2 with a little movability. The valve seat rings are pressed toward the valve ball 3 by compressive forces because of the elasticity of these flexible soft seals 15.

In this embodiment, the flow ducts of the flow-adjusting component (valve ball 3) and the valve seat rings 2 are provided in a sleeve 16 which is made of sintered ceramic material. The sleeve 16 is inserted in a passage 17 of the flow-adjusting component and/or the valve seat rings, and of course pressure-relieved in regard to material flow as has been mentioned at the outset.

The sleeves 16 are held in this embodiment in the associated passages 17 under frictional forces in a press fit or simply because their shape fits the shape of the passages.

In the embodiment according to FIG. 1, the sleeves are formed in one piece.

Figure 2:
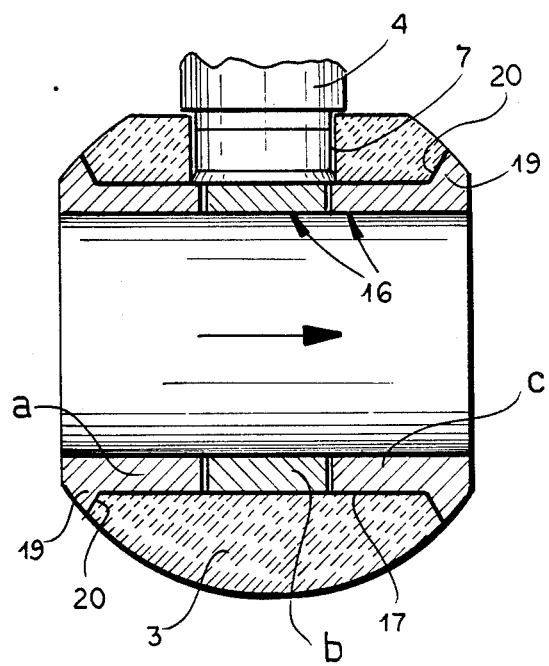
FIG. 2 is a detail cross sectional view through a portion of the controlling valve of FIG. 1 in the vicinity of the valve ball.

In the embodiment according to FIG. 2, the sleeve 16 is made of several parts, that is, it is assembled from several ring-shaped sleeve pieces a,b,c.

Figure 3:
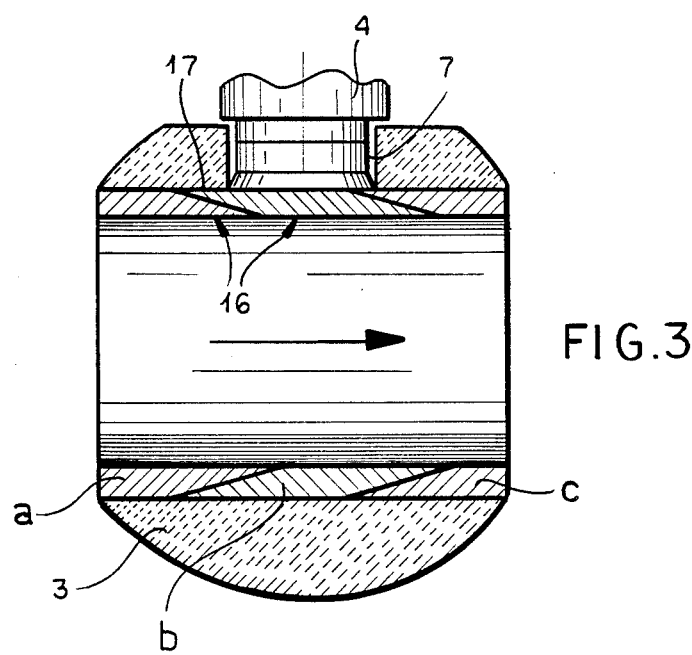
FIG. 3 is a detailed cross sectional view of a different embodiment of the controlling valve according to my invention similar to FIG. 2.

It can be seen from FIG. 3 that the sleeve pieces a,b,c are coupled with each other or mounted in each other in a conical fit with inner and outer cones.

The important parts of the sleeve and housing, i.e. the connecting elements, which control their fitting together, comprise the projections 19 which cooperate with the complementary recesses 20 in the flow-adjusting component and/or in the valve seat rings 2.

These connecting elements, i.e. the projections and complementary recesses, take only the forces which are exerted by the flow of material on the sleeve.

In the illustrated embodiment of the ball valve my invention is practical as a controlling valve for high pressure when only the flow-adjusting element, namely the valve ball 3, is made of sintered ceramic material in the way described. It can be provided with a sleeve 16 which is a single piece or a plurality of components.

The embodiment illustrated in FIG. 1 is suitable for nominal diameters of 25 to 200 mm, operating pressures up to 100 bar and temperatures between $-30°$ C. and $180°$ C. Sintered corundum and aluminum oxide are used as materials for the valve ball 3 and the valve seat rings 2. The seat leakage rate is less than 0.01% of the KV-value, so that the KV-value of the valve ball in the 25 mm nominal diameter amounts to 28 and the valve ball in the 100 mm nominal diameter amounts to 430. The torque required to operate the valve ball is 20 Nm in a ball valve with a 25 mm nominal diameter and 130 Nm with a ball valve in the 100 mm nominal diameter, however at an operating pressure of 10 bar.

In this example, the "valve seat components" referred to in the summary and the following claims are the valve seat rings 2.

I claim:

1. In a controlling valve, especially a ball valve, for a gaseous and liquid flow medium, comprising a housing, connector pipes, a flow-adjusting component and associated valve seat components, in which said flow-adjusting component and said valve seat components have corresponding flow ducts, which are made of sintered ceramic material, the improvement wherein at least said flow duct of said flow-adjusting component is located in a sleeve which is made of said sintered ceramic material, said sleeve being inserted in a passage of said flow-adjusting component, pressure-relieved in regard to material flow, and said sleeve being held in a press fit or just fitting in said passage.

2. The improvement defined in claim 1 in which said sleeve is formed in one piece.

3. The improvement defined in claim 1 in which said sleeve is formed in a plurality of sleeve pieces.

4. The improvement defined in claim 3 wherein said sleeve pieces are plugged into each other in a conical fit with an inner cone inside an outer cone.

5. The improvement defined in claim 1 wherein said sleeve has a plurality of connecting elements in the form of projections, which cooperate with complementary recesses in said flow-adjusting element.

6. The improvement defined in claim 5 wherein said connecting elements take only the forces which are exerted by the material flow in said sleeve.

7. A ball valve for controlling a gaseous and liquid flow comprising:

a housing;

a plurality of connector pipes for delivering and carrying away said gaseous and liquid flow;

a valve ball mounted in said housing, said valve ball having a passage fitting and containing an inserted sintered ceramic sleeve with a flow duct therein;

and a plurality of valve seat components associated with said valve ball, said valve seat components also having passages with inserted sintered ceramic sleeves and flow ducts therein, said valve seat component flow ducts being alignable with said flow duct in said sleeve of said valve ball during valve operation so that said valve ball may be opened, said valve ball sleeve being pressure-relieved in regard to material flow just fitting in said passages, said valve ball sleeve having a plurality of connecting elements in the form of projections, which cooperate with complementary recesses in said valve ball.

* * * * *